Feb. 11, 1969  W. J. WITWER  3,426,926
HYDRAULIC SYSTEM FOR USE WITH TELESCOPIC BOOM APPARATUS
Filed Oct. 17, 1967  Sheet 1 of 6
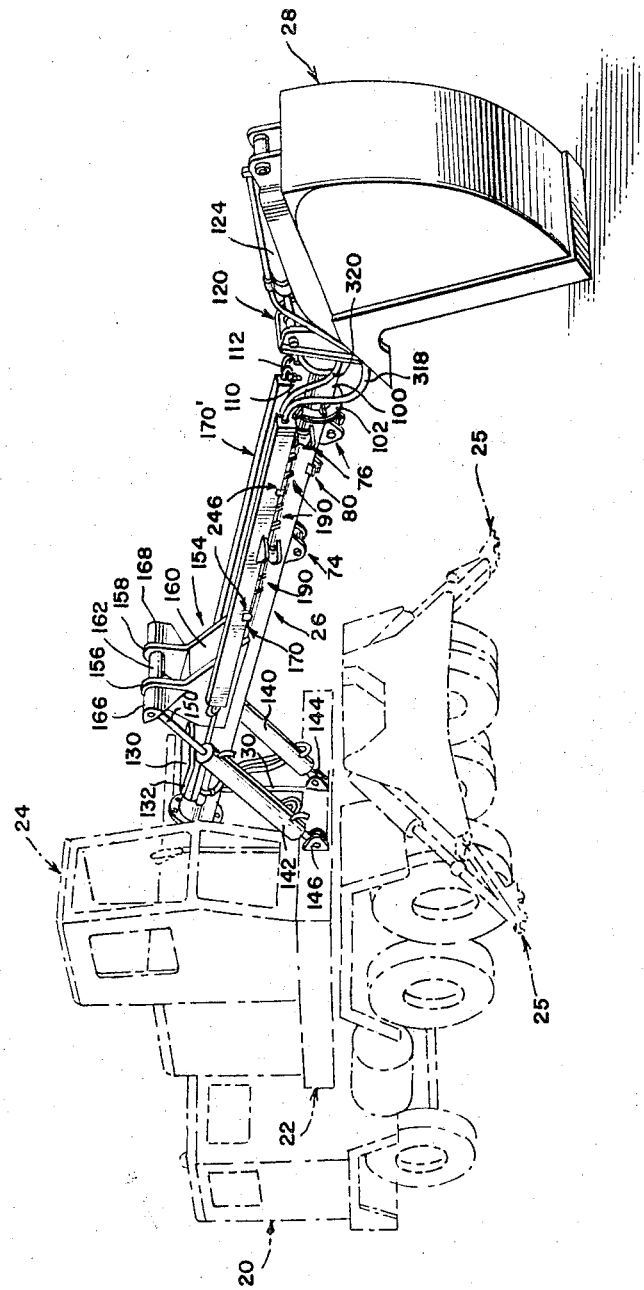
INVENTOR
WALLACE J. WITWER
BY Shoemaker and Mattare
ATTORNEYS

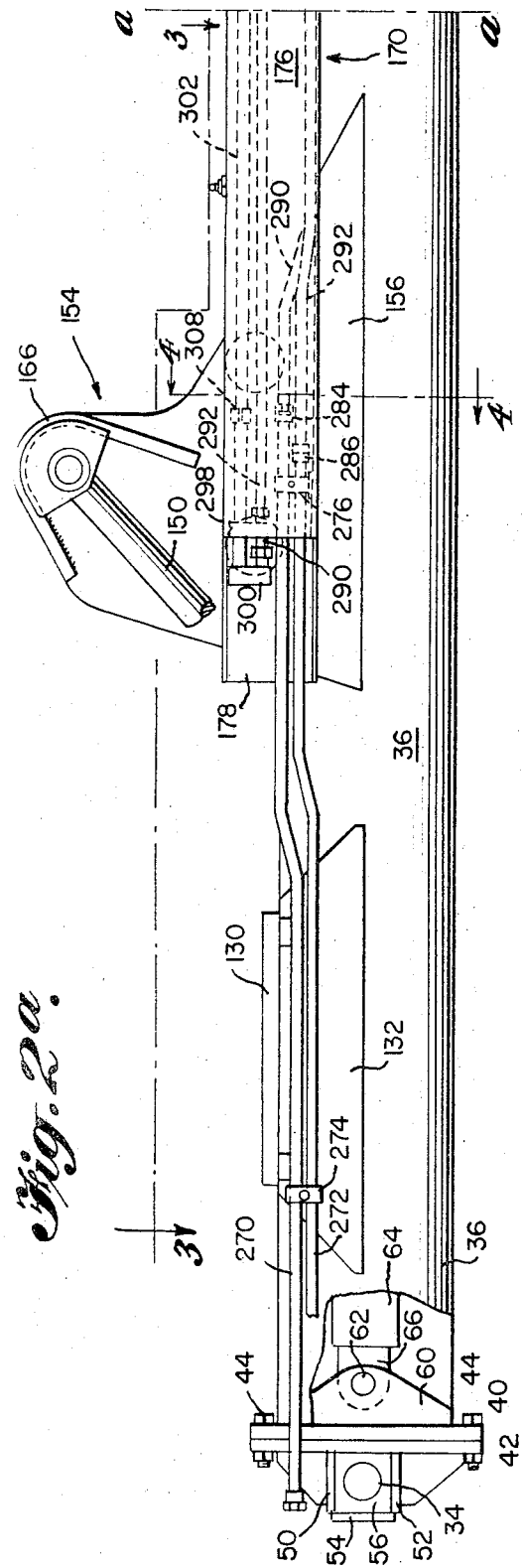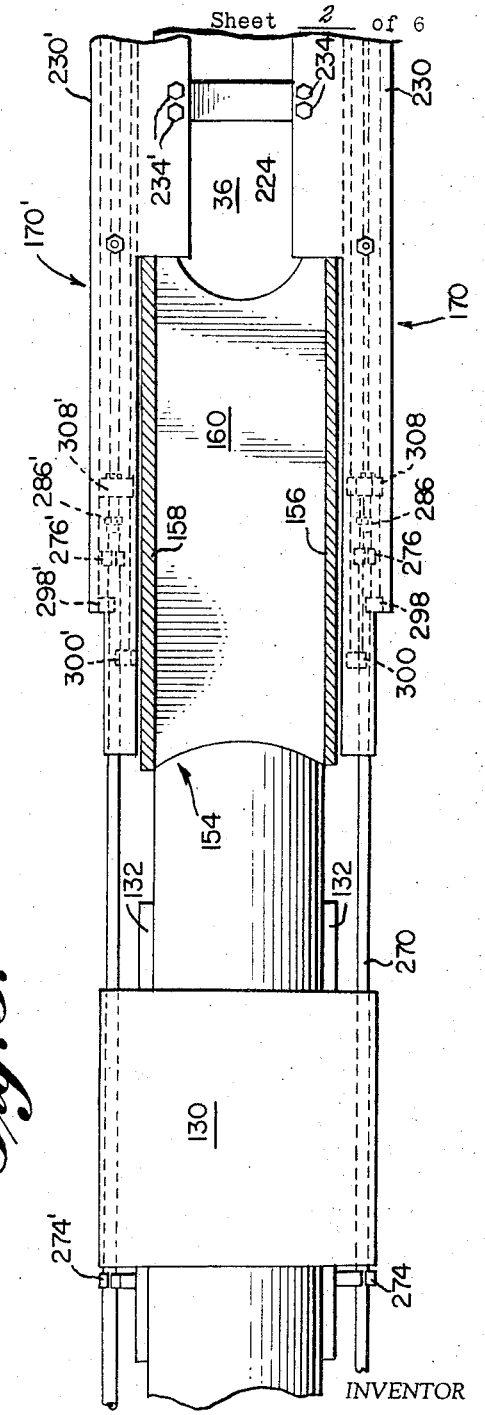

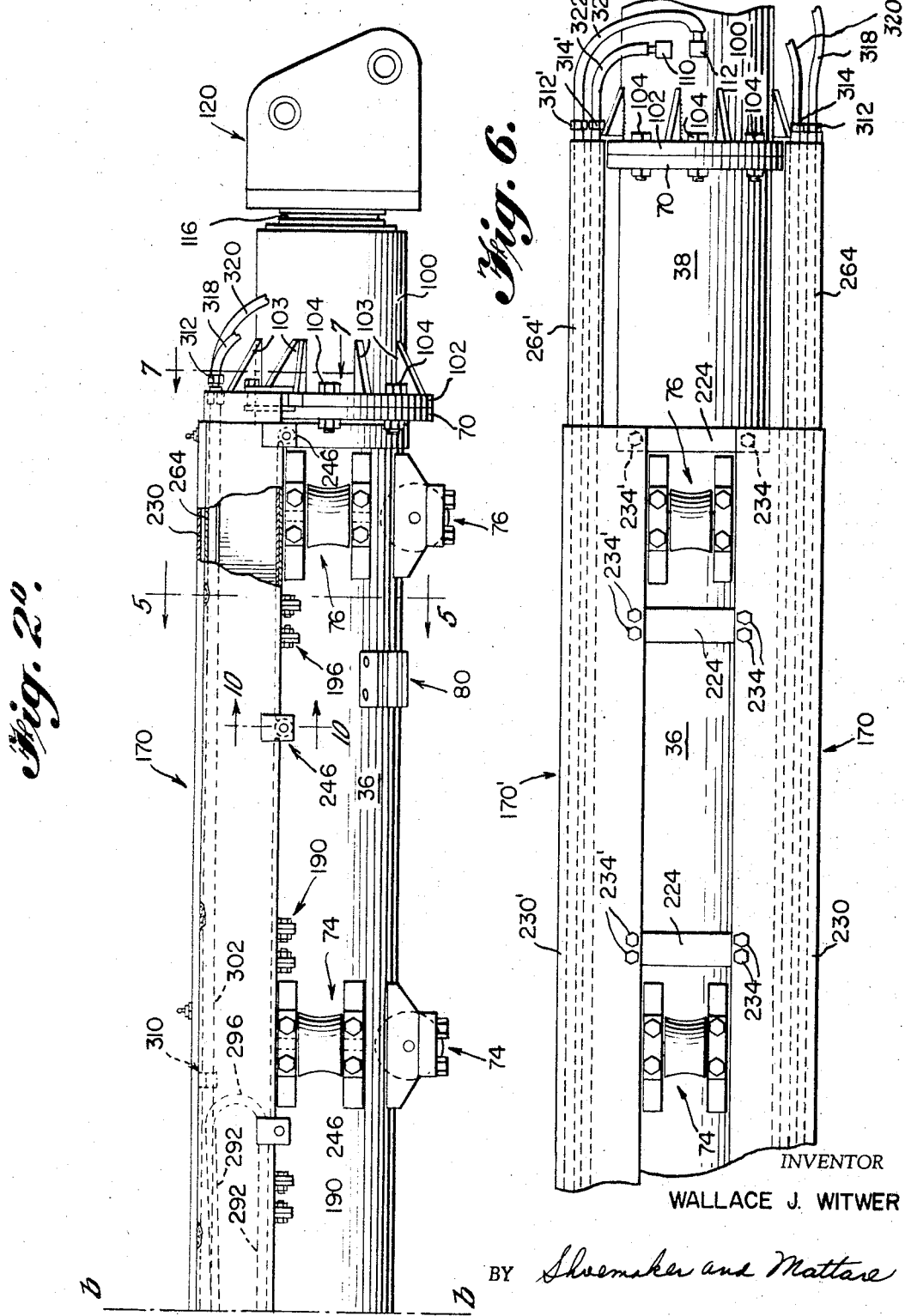

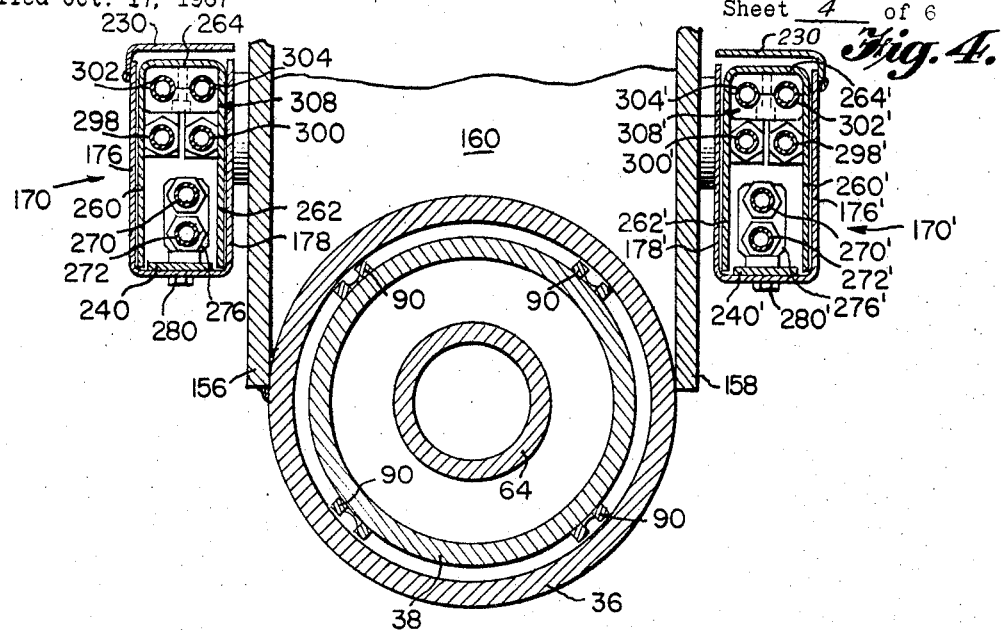
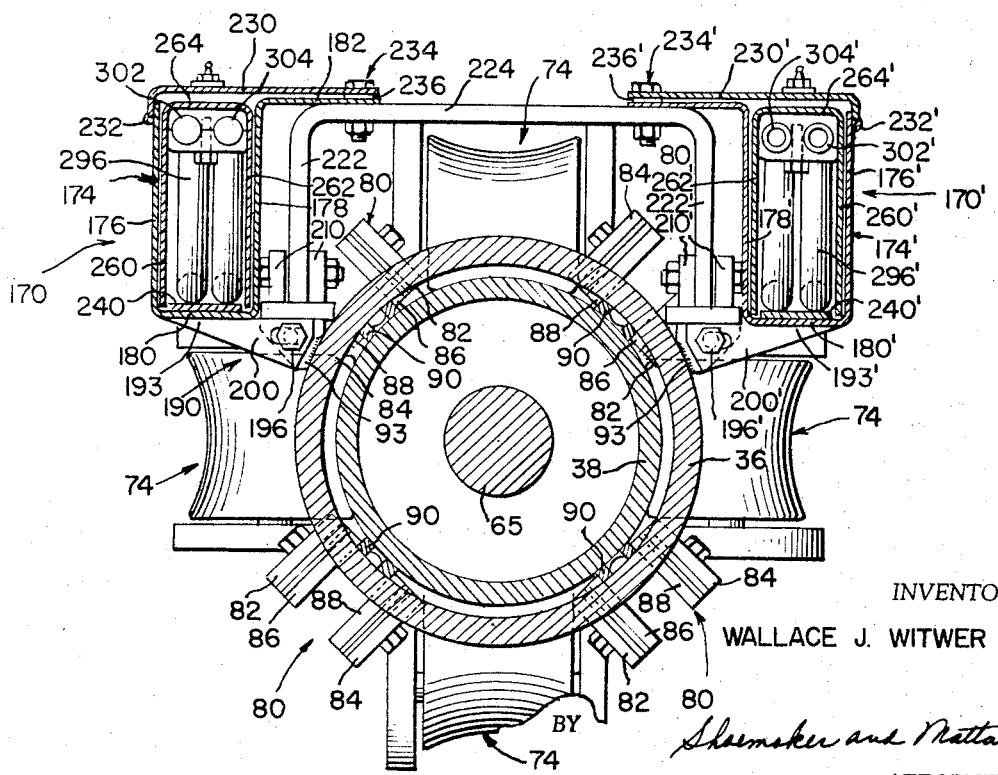

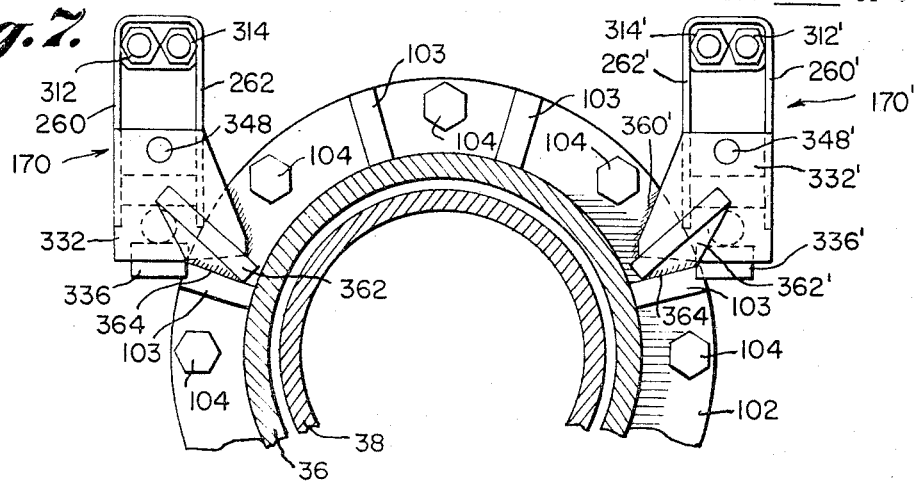
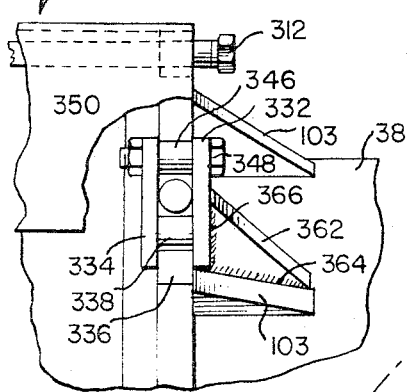
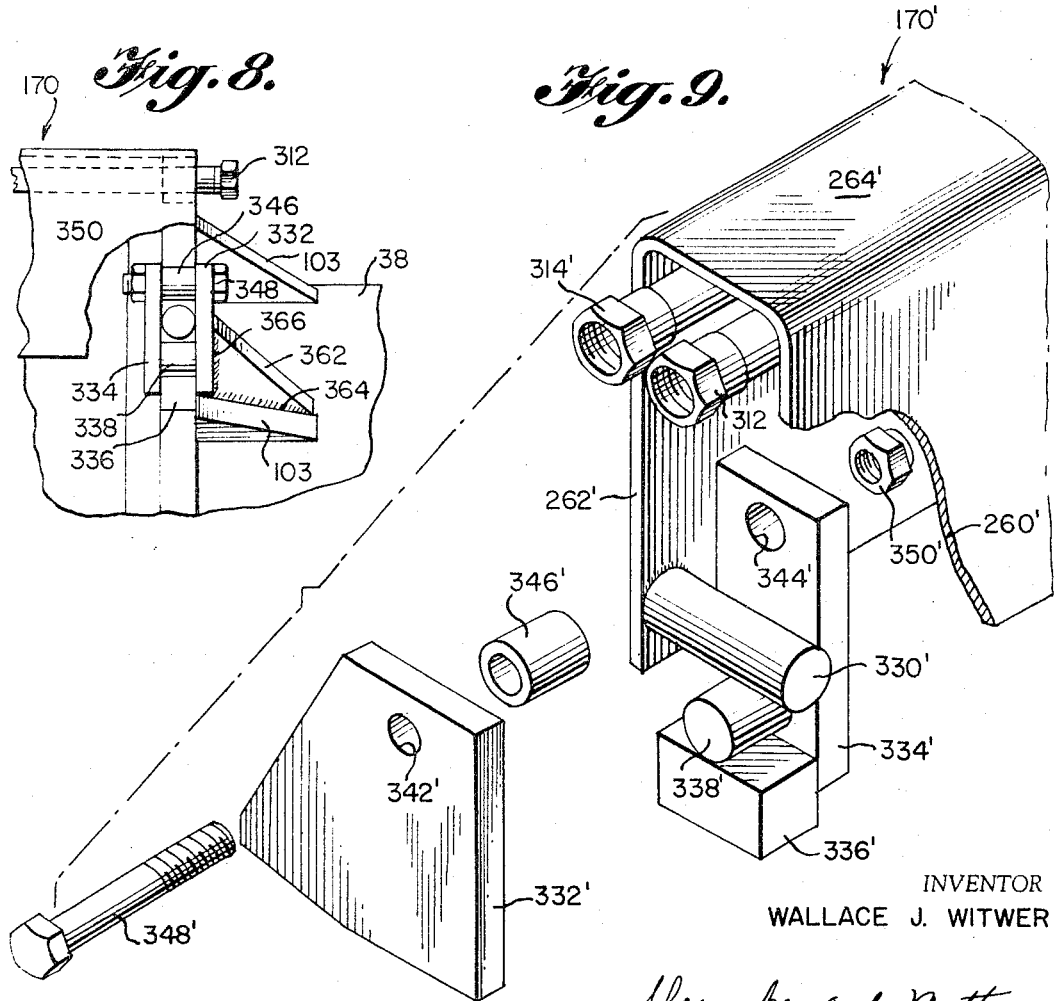

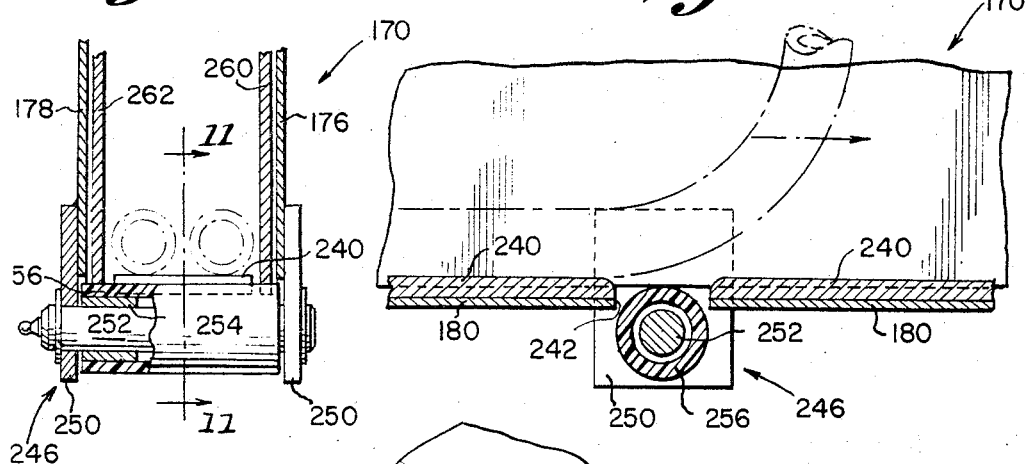
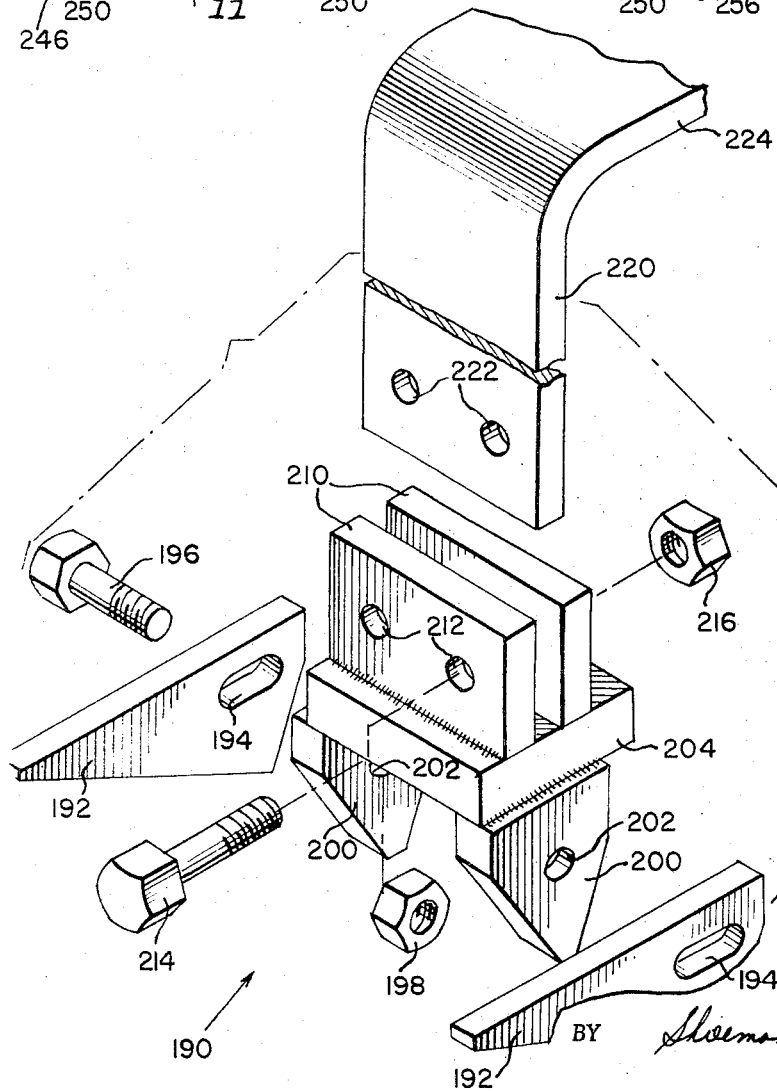

United States Patent Office 3,426,926
Patented Feb. 11, 1969

3,426,926
HYDRAULIC SYSTEM FOR USE WITH
TELESCOPIC BOOM APPARATUS
Wallace J. Witwer, Waukesha, Wis., assignor to Hein-Werner Corporation, Waukesha, Wis., a corporation of Wisconsin
Filed Oct. 17, 1967, Ser. No. 675,821
U.S. Cl. 214—141                              10 Claims
Int. Cl. E02f 3/00; B66c 23/06

ABSTRACT OF THE DISCLOSURE

The inner portion of a telescopic boom is adapted to support a hydraulically operated attachment at the outer end thereof. A hydraulic system for supplying hydraulic fluid to the attachment is mounted within separate housing portions secured to the outer boom portion, and flexible conduit means is disposed within these housing portions. This flexible conduit means is doubled back within the housing portions so as to move into its operative positions with a rolling action.

Background of the invention

The present invention relates to a hydraulic system including flexible conduit portions for conducting hydraulic pressure to hydraulically operated attachment means mounted on a telescopic boom arrangement such as employed in excavator and grader apparatus and the like.

Since the boom means includes telescopic portions which are adapted to extend and retract with respect to one another, it is necessary to provide a hydraulic system which includes conduit means which will accommodate such telescopic movements of the boom portions.

A typical prior art arrangement of such a hydraulic system is shown for example in copending U.S. patent application Ser. No. 541,998, now Patent No. 3,396,860 and the present invention represents an improvement over the arrangement shown in this copending application. As shown in this application, the hydraulic system extends within the telescopic boom means and includes flexible conduit portions which are retracted through one end of the boom.

The flexible conduit portions in this type of prior art arrangement are retracted by suitable take-up mechanism including pulleys and spring means which apply constant tension on the flexible conduit means tending to withdraw them from the boom means, the flexible conduit means being drawn outwardly as the inner boom portion is extended from the outer boom portion.

This type of prior art arrangement has presented a number of problems. It has been found that the withdrawing springs do not always work properly, and often the flexible hydraulic conduit portions will not withdraw properly from the boom means.

It has also been found that when utilizing such prior art take-up mechanisms, any sudden lurching of the boom components with respect to one another tends to pull the flexible conduit means apart thereby resulting in breakage of the conduit means.

When the hydraulic system is mounted within the boom, a relatively expensive construction is provided, and it is difficult to maintain and service this type of arrangement.

Additionally, this type of prior art support for the hydraulic system results in considerable sliding and relative movement of the flexible conduit portions of the hydraulic system which causes excessive wear on these hydraulic conduit portions.

A further difficulty encountered with an arrangement as shown in the aforementioned patent application is the fact that the point about which the boom is pivoted cannot be readily changed without modifying the hydraulic system, thereby limiting the versatility of the structure.

Summary of the invention

The present invention employs a novel arrangement wherein the hydraulic system includes a pair of housing portions, the innermost of these housing portions being movable with respect to the outermost thereof, and flexible conduit means being supported within these housing portions. The flexible conduit means is doubled back in the retracted position of the boom means so that the opposite ends of the flexible conduit means are fixed with respect to the inner ends of the two housing portions of the hydraulic system. Accordingly, upon extension or retraction of the associated boom means, the flexible conduit means moves into operative position in a rolling movement.

The arrangement of the present invention does not require the utilization of any spring means, so there is no problem as to the springs working properly or failing to withdraw the hydraulic conduit means in a proper manner. Furthermore, there is no possibility of the hydraulic conduit portions pulling apart if the boom portion should suddenly lurch with respect to one another.

The arrangement of the present invention provides a hydraulic system which is considerably cheaper than a structure wherein the system is incorporated within the boom itself, and the hydraulic system is much easier to maintain and service when necessary.

The rolling action of the flexible conduit means of the present invention eliminates any relative frictional sliding engagement as encountered in prior art arrangements thereby resulting in negligible wear on the hydraulic conduit means.

The boom means of the present invention can be mounted for pivotal movement about many different pivot points without modifying the hydraulic system associated therewith.

The hydraulic system of the present invention is additionally protected from the elements and eliminates the necessity of providing any pulleys or additional structure of this nature.

An object of the present invention is to provide a new and novel hydraulic system for use with telescopic boom apparatus which eliminates the necessity of providing spring and pulley arrangements; which further reduces wear on the hydraulic conduit means of the system; which is easier to maintain and service; and further which is quite simple and inexpensive in construction, yet at the same time is efficient and reliable in operation.

Brief description of the drawings

FIG. 1 is a top perspective view of the apparatus of the present invention illustrated in combination with an excavator and grader attachment at the outer end of a pivotally mounted telescopic boom means;

FIGS. 2a and 2b in conjunction with one another illustrate a side view of the boom means and associated hydraulic system with an attachment at one end of the boom means;

FIG. 3 is a sectional view taken substantially along line 3—3 of FIG. 2a looking in the direction of the arrows;

FIG. 4 is a sectional view taken substantially along line 4—4 of FIG. 2a looking in the direction of the arrows;

FIG. 5 is a sectional view taken substantially along line 5—5 of FIG. 2b looking in the direction of the arrows;

FIG. 6 is a top view of a portion of the structure shown in FIG. 2b and illustrating the inner boom portion extended from the outer boom portion;

FIG. 7 is a sectional view taken substantially along line 7—7 of FIG. 2b looking in the direction of the arrows;

FIG. 8 is a side view partly broken away of a portion of the structure shown in FIG. 7;

FIG. 9 is a top perspective exploded view illustrating the manner in which the lost motion connection means is provided at the outer end of the inner housing portion of the hydraulic system;

FIG. 10 is a sectional view on a greatly enlarged scale taken substantially along line 10—10 of FIG. 2b looking in the direction of the arrows;

FIG. 11 is a sectional view taken substantially along line 11—11 of FIG. 10 looking in the direction of the arrows; and FIG. 12 is a top perspective exploded view on an enlarged scale illustrating the manner in which the cross brace members are connected with bracket means secured to the outer boom portion and to the outer housing portion of the hydraulic system.

*Description of the preferred embodiment*

Referring now to the drawings wherein like reference characters designate corresponding parts throughout the several views, the present invention is illustrated as an excavator and grader mechanism. In this type of apparatus, a telescopic boom is provided, and the hydraulic system of the present invention is especially adapted for use with a telescopic boom arrangement. While the apparatus is illustrated as being mounted on a wheeled vehicle, the apparatus is suitable for mounting in many different ways.

The present invention represents an improvement over the aforementioned U.S. patent application Ser. No. 541,998 which discloses a similar excavator and grader arrangement, and the disclosure of this copending patent application is incorporated by reference into the present application.

Referring particularly to FIG. 1 of the drawings, a self-propelled wheeled vehicle is indicated generally by reference numeral 20, this structure being of relatively conventional construction and including a rotatable turntable 22 mounted thereon and having a cab means 24 supported thereabove which is adapted to enclose the operator during use of the apparatus. Suitable control means is provided in the cab means to enable the apparatus of the invention to be selectively operated. The vehicle may also be provided with relatively conventional jack means indicated generally by reference numerals 25 for engaging the ground to stabilize the vehicle when in use. The boom means is indicated generally by reference numeral 26, and a tool or attachment is indicated generally by reference numeral 28, this attachment being in the form of a bucket supported at the outer end of the boom means.

Other suitable hydraulically operated tools or attachment means may be supported at the outer end of the boom, and the hydraulic system of the present invention is particularly adapted to provide hydraulic pressure to the hydraulically operated attachment means supported at the outer end of the boom.

The inner end of the boom means is pivotally supported in the same manner as disclosed in the aforementioned copending U.S. patent application, and a pair of spaced vertically extending support members or plates 30, one of which is visible in FIG. 1 of the drawings, are fixed to turntable 22, a pivot pin 34 being supported between these plates, this pivot pin being illustrated at the lefthand end of FIG. 2a of the drawings. The boom means includes an outer substantially cylindrical portion 36 as seen for example in FIGS. 4 and 5, an inner substantially cylindrical portion 38 being spaced from the outer boom portion and being movable longitudinally with respect thereto as described hereinafter.

As seen in FIG. 2a, a collar 40 is secured to the inner end of the outer boom portion 36 as by welding or the like, this collar being fixed to a plate 42 by a plurality of spaced nut and bolt assemblies 44, these nut and bolt assemblies extending through suitable aligned holes provided in members 40 and 42.

A pair of substantially parallel generally rectangular members 50 and 52 are fixed to the rear face of plate 42 and extend substantially normally therefrom. The outer edges of these members are interconnected by a flat substantially rectangular member 54, all of these latter three various members being rigidly interconnected with one another as by welding or the like. Block-like members 56 are snugly fitted within opposite ends of the box-like structure provided by members 50, 52 and 54 and are rotatably supported upon the aforementioned pivot pin 34 whereby the outer portion 36 of the boom means is pivotally supported.

A pair of spaced ear members 60 are fixedly secured as by welding to the forward face of plate 42, these ear members having holes receiving a pivot pin 62. A power-operated extending means includes a hydraulic cylinder 64 having an ear 66 rigidly affixed at one end thereof, this ear having a hole formed therein which receives pivot pin 62 whereby the inner end of the power-operated extending means is pivotally interconnected with plate 42. A piston rod indicated by reference numeral 65 in FIG. 5 extends outwardly from hydraulic cylinder 64 and is pivotally interconnected with a mounting plate 70 as seen in FIG. 2b which is disposed at the outer end of the inner boom portion 38 previously described. Extension of the piston rod from the hydraulic cylinder 64 causes the inner boom portion to be extended from the outer boom portion.

As seen most clearly in FIGS. 1 and 2b as well as FIG. 6, anti-friction support means for supporting the inner portion of the boom so as to facilitate relative longitudinal movement thereof with respect to the outer portion of the boom comprises two sets of rollers indicated generally by reference numerals 74 and 76. Each set of rollers 74 and 76 includes four rollers circumferentially spaced about the outer boom portion 36 at 90° intervals, these rollers being supported by the outer boom portion and extending through suitable openings therein inwardly into engagement with the outer surface of the inner boom portion.

It will be noted that the two sets of rollers are longitudinally spaced along the outer boom portion so as to support the inner boom portion at spaced longitudinal points thereof. Each of the various rollers are of substantially the same construction as those in the aforementioned copending patent application.

As seen most clearly in FIG. 5, guide means for preventing relative rotation of the inner boom portion with respect to the outer boom portion includes a plurality of guide portions indicated generally by reference numeral 250. These guide portions are disposed in circumferentially spaced relationship about the outer boom portion intermediate the two sets of longitudinally spaced rollers and are positioned closer to the set of rollers 76 than to the set of rollers 74. These guide portions 250 are positioned at 90° intervals about the outer boom portion and are offset 45° from the positions of the guide rollers.

Each of the guide portions 80 includes a pair of substantially parallel side plates 82 and 84 fitting snugly within opposite sides of slots extending through the outer boom portion and being fixed in place. Wear shoes 86 and 88 are mounted upon side plates 82 and 84 respectively, the inner faces of these wear shoes being disposed substantially parallel with one another for engaging cooperatign guide means fixed to the outer surface of the inner boom portion. This arrangement of the guide portions and guide means is substantially the same as that shown in the aforementioned patent application.

As seen most clearly in FIGS. 4 and 5, four equally spaced longitudinally extending guide strips 90 are secured to the outer surface of the inner boom portion 38. These guide strips are positioned so as to ride between pairs of facing wear shoes on the various guide portions. The guide strips are secured in place as for example by welding or the like. The interengagement of the guide strips with the associated wear shoes will serve to guide longitudinal movement of the inner boom portion and prevent relative rotation between the inner boom portion and the outer boom portion. The guide strips are provided along a sufficient portion of the longitudinal extent of the outer surface of the inner boom portion so as to ensure that the inner boom portion is guided by this guide means throughout the extent of longitudinal movement thereof.

As seen in FIGS. 1, 2b and 6, the excavator and grader attachment means includes a cylindrical housing portion 100 having an annular member 102 in surrounding relationship to one end thereof and rigidly affixed thereto as by welding or the like. Gusset plates 103 are rigidly affixed between the housing and annular member to reinforce the structure. Annular member 102 is secured to the outer periphery of the mounting plate 70 by a plurality of nut and bolt assemblies 104 extending through aligned openings formed in members 102 and 70.

A hydraulically operated rotator means is mounted within the housing portion 100, fittings 110 and 112 as seen in FIG. 6 being in communication with the rotator means for operating the same when hydraulic pressure is introduced through one or the other of these fittings. The rotator means is adapted to rotate a shaft 116 as seen in FIG. 2b which is fixed to a tool or bucket support means indicated generally by reference numeral 120. This bucket means is mounted for pivotal movement on the bucket support means 120, and as seen in FIG. 1, the bucket means 28 is actuated for pivotal movement by a hydraulic ram means 124 connected between the bucket support means and a portion of the bucket. The structure of the rotator means as well as the bucket support means and the bucket itself is substantially identical with that disclosed in the aforementioned copending patent application. The hydraulic system of the present invention is adapted to provide hydraulic system both to the rotator means mounted within the housing 100 and the hydraulic ram means 124 whereby the position of the bucket at the outer end of the boom means may be remotely controlled.

Winch mounting means includes a winch mounting plate 130 which is suitably secured to a pair of plates 132 which are rigidly affixed to opposite sides of the outer boom portion 36 as by welding or the like. This winch means may be employed when the apparatus is used as a crane for example wherein a different type of attachment means may be provided at the outer end of the boom means.

As seen in FIG. 1, power-operated boom elevating means comprises a pair of hydraulic cylinders 140 and 142 including lower reduced attaching end portions which are mounted for pivotal movement about suitable pivot axes mounted in support portions 144 and 146 fixed with respect to the supporting structure. It is accordingly apparent that the inner ends of these boom elevating hydraulic rams are mounted for pivotal movement about fixed axes. Piston rods are connected with pistons slidably disposed within each of the cylinders 140 and 142, one of these piston rods being visible in the drawings and being indicated by reference numeral 150, the outer ends of these piston rods being adapted to be connected with connecting means mounted on the boom.

The connecting means is indicated generally by reference numeral 154 and includes a pair of spaced plates 156 and 158 which are disposed substantially parallel with one another and which are fixed at the lower edge portions thereof to the sides of the outer boom portion 36 as by welding or the like. Plates 156 and 158 are interconnected by a cross brace member 160 the lower edges of which are of arcuate configuration to fit snugly about the outer surface of boom portion 36, while the opposite side edges of member 160 are disposed flush against the inner surfaces of plates 156 and 158 and are rigidly connected thereto as by welding or the like. A tubular member 162 as seen in FIG. 1 also rigidly interconnects plates 156 and 158 with one another.

A pair of generally arcuate bracket members 166 and 168 are fixedly secured to plates 156 and 158 respectively and extend outwardly from the outer surfaces thereof. These bracket members serve to support suitable pin means which are pivotally interconnected with the outer ends of the piston rods extending from the hydraulic cylinders 142 and 140 respectively thereby pivotally interconnecting the power-operated boom elevating rams with the outer boom portion 36.

The hydraulic system of the present invention includes two substantially identical units which are mirror images of one another and which are disposed symmetrically relative to the longitudinal axis of the boom and on generally opposite sides thereof and at the upper portion of the boom. These two units are identified by the reference numerals 170 and 170' in general, and in the following description, a single one of these units will be described in detail, it being understood that the opposite unit is of the same configuration and construction. Those portions of the unit 170' similar to those of the unit 170 are provided with the same reference numerals primed.

As seen most clearly in FIG. 5, hydraulic unit 174 includes a first outer housing portion indicated generally by reference numeral 174 being of generally channel-shaped cross-sectional configuration and opening in an upward direction. This housing portion includes a pair of spaced side walls 176 and 178 which are disposed substantially parallel with one another and which are interconnected by a bottom wall 180. An inwardly extending flange portion 182 is formed integral with side wall portion 178 and extends substantially normally thereto. This first housing portion is supported by a support mechanism indicated generally by a plurality of spaced supporting brackets indicated generally by reference numeral 190 and secured to the outer boom portion 36.

Referring to FIG. 12, a pair of spaced members 192 are provided with slots 194. The upper surfaces of these members 192 are in engagement with the undersurface of the bottom wall 180 of the first housing portion and are suitably secured thereto as by welding or the like as indicated by reference numeral 193 in FIG. 5. Again referring to FIG. 12, a bolt 196 is adapted to extend through each of the slots 194 formed in members 192, and is adapted to have a nut 198 threaded on the outer threaded end thereof. A pair of bracket members 200 are provided with holes 202 which are adapted to be aligned with the slots 194 within one of members 192 whereby the members 192 may be bolted to the bracket members 200.

These bracket members 200 are welded to the outer surface of the outer boom portion 38 as indicated by reference numerals 203 in FIG. 5.

Referring again to FIG. 12, a member 204 is rigidly affixed as by welding to the upper surfaces of bracket members 200. A further pair of support members 210 are fixedly secured to the upper surface of member 204 as by welding and are disposed in spaced parallel relationship with one another. Each of support members 210 is provided with a pair of holes 212 formed therethrough, these holes being adapted to receive a bolt 214 which in turn is adapted to have a nut 216 threaded on the outer threaded end thereof.

A cross brace member includes a depending leg portion 220 having a pair of spaced holes 222 formed therethrough, these holes being adapted to be aligned with the holes 212 so that the bolts 214 can be extended through these aligned holes to rigidly affix leg portion 220 of the cross brace member between the support members 210.

The cross brace member also includes a connecting portion 224 as seen most clearly in FIG. 5 which in turn joins with the opposite leg portion 222' which is adapted to be rigidly affixed between support members 210' corresponding to the members 210 previously described. A plurality of these cross brace members are provided between the two hydraulic units at spaced points along the boom.

As seen in FIG. 5, a cover member 230 is provided for closing off the upper portion of the housing portion 174. This cover member includes a depending outer flange which is spot welded as indicated by reference numeral 232 at spaced points therealong to the side wall 176 of the first housing portion. Nut and bolt assemblies 234 are adapted to extend through aligned holes provided through cover member 230 and the flange 182 previously described as well as through the connecting portion 224 of each of the cross brace members whereby the cross brace members serve to rigidly interconnect the two hydraulic units with one another and to support them in proper position on the boom means. Spacer washers are provided between the cover members 230 and the flange portions 182.

As seen most clearly in FIGS. 10 and 11, an elongated strip of material 240 is supported on the bottom wall 180 of the first housing portion, this strip of material 240 being of a width considerably less than the space between the inner surfaces of side walls 176 and 178 of the first housing portion. As seen in FIG. 11, the strip of material 240 is interrupted at certain points along the hydraulic unit wherein transversely extending slots 242 are provided in the lower portion of the housing portion. These slots are disposed at those locations where anti-friction means 246 are mounted. As seen in FIG. 2b, three of these anti-friction means 246 are provided at spaced points along the outer housing portion, these anti-friction means being for the purpose of supporting the second housing portion hereinafter described for relative movement with respect to the first housing portion in a substantially anti-friction manner.

As seen in FIG. 10, a pair of depending plates or ears 250 are rigidly affixed as by welding to the outer surfaces of the opposite side walls 176 and 178 of the first housing portion. These depending plates 250 have aligned holes formed therethrough which support a pin member 252 extending therethrough. Spaced bearing means 254 are provided about opposite end portions of the pin member 252 and support a cylindrical support member 256 which is adapted to rotate about pin 252. This cylindrical support member may be formed of a suitable plastic substance which has suitable anti-friction qualities.

As seen most clearly in FIGS. 4 and 5, the second or inner housing portion is also of generally channel-shaped cross-sectional configuration and opens in a downward direction, this housing portion including opposite side walls 260 and 262 which are substantially parallel with one another and which are joined by a top wall 264. Referring again particularly to FIG. 10, it will be note that the lower edges of the side walls 260 and 262 are supported by the cylindrical support member 256 so that the remaining portions of the bottom edges of the side walls of the inner housing portion between the spaced anti-friction support members are spaced above the bottom wall of the first-mentioned outer housing portion. This enables the inner second housing portion to slide freely within the outer housing portion. It will also be noted as seen in FIG. 4 and 5 that the side walls of the two housings may be spaced slightly from one another so as to prevent undue friction and difficulty of movement.

Referring now particularly to FIG. 2a, a pair of rigid pieces of conduit or tubing 270 and 272 are secured by a bracket member 274 to the member 132 previously described and extend along the side of the boom. These relatively rigid tubing portions may be connected with any suitable source of hydraulic pressure which it is adapted to transmit to the outer end of the boom.

The forward ends of the relatively rigid tubing portions 270 and 272 extend within the central portion of the housing portions previously described each of which are open at opposite ends thereof, and a bracket member 276 as seen in FIG. 4 supports the tubing portions 270 and 272 which have fittings 284 and 286 respectively disposed at the forward end thereof. As seen in FIG. 4, a screw 280 is adapted to extend through suitable holes provided in the housing portion for securing the mounting bracket 276 in place.

Referring again to FIG. 2a, two lengths of reinforced hydraulic flexible hose 290 and 292 are provided, these two flexible conduit portions having fittings at one end thereof which cooperate with the fittings 284 and 286 for securing the flexible conduit portions to the aforementioned relatively rigid tubing portions. The flexible conduit portions 290 and 292 extend forwardly and rest side by side on the support member 240 previously described. As seen in FIG. 2b, the flexible conduit portions are provided with an arcuate intermediate portion 296 when the boom means is in the retracted position illustrated and the flexible conduit portions are doubled back in the upper part of the housing portions of the hydraulic system and extend rearwardly.

As seen in FIGS. 2a and 4, the opposite ends of flexible conduit portions 292 and 290 are connected with fittings 298 and 300 respectively which in turn are connected with relatively rigid tubing portions 302 and 304. These rigid tubing portions are held in place by a clamping bracket indicated generally by reference numeral 308 and supported from the upper portion of the inner housing portion. As seen in FIG. 2b, the rigid tubing portions 302 and 304 extend forwardly along the upper portion of the inner housing portion and are secured by an intermediate bracket means 310 and terminate at the forward ends thereof in fittings 312 and 314 as seen in FIGS. 7 and 9. These fittings extend slightly forwardly of the outer open end of the inner housing portion for connection with further flexible conduit means. As seen in FIG. 6, fittings 312 and 314 are connected with flexible conduits 318 and 320 which in turn are interconnected with the hydraulic ram means 124 previously described. The fittings 312' and 314' at the opposite side of the boom means are connected with flexible conduit means 322 and 324 which in turn are connected with fittings 110 and 112 respectively previously described.

Referring now particularly to FIG. 9, the construction of the lost motion connection provided between the outer end of the second inner housing portion and the inner portion of the boom means may be most clearly understood. As seen in this figure, a cylindrical bar member 330' has the opposite ends thereof rigidly secured to the side walls 260' and 262' of the inner housing portion as by welding or the like. Plates 332' and 334' are disposed in spaced parallel relationship with one another, and an intermediate block portion 336' is rigidly affixed to the facing surfaces of plates 332' and 334'. It should be understood that plate 332' has been exploded in this view for the sake of clarity. A further cylindrical bar member 338' has the opposite ends thereof rigidly affixed to the facing surfaces of plates 332' and 334' as by welding to thereby provide a rigid assembly including members 332', 334', 336' and 338'.

Aligned holes 342' and 344' are provided through plates 332' and 334' respectively. A tubular member 334' is adapted to be positioned between plates 332' and 334' with the bore formed therethrough in alignment with the holes 342' and 344'. When spacer member 346' is in position, a bolt 348' may be inserted through holes 342', 344' and the bore in spacer member 346' and is adapted to receive a nut 350' on the outer end thereof for securing this assembly in operative relationhip with respect to the bar member 330' previously described.

Referring now particularly to FIG. 7, the manner in which plate 332' is secured to the outer end of the inner portion of the boom is illustrated. As seen in this figure, a portion of plate 332' is rigidly affixed to the forwardly facing surface of the annular member 102 as by welding as indicated by reference numeral 360'. Additionally, a gusset member 362' is provided which is welded as indicated at 364 to the adjacent gusset member 103 which is interconnected with annular member 102. As seen most clearly in FIG. 8, this member 362 is also welded as indicated by reference numeral 366 to the plate 332 for rigidifying the interconnection between the plates and the annular member 102 which is in turn interconnected with the outer end of the inner boom portion.

The interconnection between the outer end of the inner housing portion and the outer end of the boom portion is a lost motion connection in a direction extending substantially perpendicular to the longitudinal axis of the boom since as will be clear from an inspection of FIGS. 8 and 9, the boom will be adapted to move up and down or in a vertical direction with respect to the outer end of the housing portion of the hydraulic system, but it cannot move relatively to the hydraulic system housing portions in a direction extending substantially parallel with the longitudinal axis of the boom means. This lost motion connection is such that any push-pull movements of the telescopic boom in a direction parallel with its longitudinal axis will be immediately followed by corresponding telescopic movement of the two housing portions of the hydraulic system. On the other hand, if the outer end of the boom tends to deflect downwardly under load, this deflection is permitted without affecting the position of the housing portions of the hydraulic system, thereby preventing any deflections of the boom downwardly under load from affecting the alignment of the housing portions of the hydraulic system.

It is apparent from the foregoing that there is provided according to the present invention a new and novel hydraulic system for use with telescopic booms wherein the necessity of providing springs and pulleys is completely eliminated, and there is no possibility of pulling the flexible conduit portions apart if the components of the boom should suddenly lurch with respect to one another. An important feature of the present invention is the fact that wear on the flexible portions of the hydraulic conduit means is negligible. This is due to the fact that as the boom extends and retracts, the flexible conduit portions of the hydraulic system move into position with a simple rolling action, and there is no relative sliding or abrasive contact involved. The hydraulic system flexible conduit portions are supported above the anti-friction support means and do not come into contact therewith due to the fact that the upper surface of member 240 is above the upper level of the cylindrical anti-friction support members.

The hydraulic system of the present invention is relatively easy to maintain and service and the components thereof are protected from the elements. Additionally, the boom can be placed in many different pivot positions without modifying the hydraulic system, thereby considerably enhancing the versatility of the arrangement.

As this invention may be embodied in several forms without departing from the spirit or essential characteristics thereof, the present embodiment is therefore illustrative and not restrictive.

I claim:

1. In combination, boom means comprising an outer boom portion having an open end, an inner boom portion supported within said outer boom portion for relative movement longitudinally thereof and through said open end thereof, means for mounting a hydraulically operated attachment at the outer end of said inner boom portion, a hydraulic system for use with said boom means comprising a first housing portion supported by said outer boom portion, a second housing portion supported for movement relative to said first housing portion, and flexible conduit means disposed within said first and second housing portions, said flexible conduit means in retracted position of said boom means and said first and second housing portions being doubled back to form an arcuate intermediate portion, one end of said flexible conduit means being fixed with respect to one end portion of said first housing portion, the opposite end of said flexible conduit means being fixed with respect to one end portion of said second housing portion, said opposite ends of the flexible conduit means being fixed with respect to the inner ends of the associated housing portions.

2. Apparatus as defined in claim 1 wherein said first housing portion is of generally channel-shaped cross-sectional configuration and opens upwardly, while said second housing portion is generally channel-shaped in cross-sectional configuration and opens downwardly, said second housing portion being supported within said first housing portion.

3. Apparatus as defined in claim 1 including anti-friction means supported by said first housing portion and supporting said second housing portion for movement relative to said first housing portion.

4. Apparatus as defined in claim 3 wherein said anti-friction means comprises a plurality of roller members supported at the lower part of said first housing portion for supporting movement of said second housing portion thereabove.

5. Apparatus as defined in claim 4 including means on said first housing portion for supporting a part of said flexible conduit means, the upper portions of said roller members being disposed below the upper portion of said flexible conduit support means so that said part of the flexible conduit means does not contact said roller members.

6. Apparatus as defined in claim 1 wherein the interconnection between the outer end of said second housing portion and the outer end of said inner boom portion comprises a lost motion connection.

7. Apparatus as defined in claim 6 wherein the lost motion connection is such that lost motion is permitted in a direction extending substantially perpendicular to the longitudinal axis of said boom means, but no lost motion is permitted in a direction extending substantially parallel with the longitudinal axis of said boom means.

8. Apparatus as defined in claim 1 including rigid tubing interconnected with one end of said first housing portion, one end of said flexible conduit means being connected with said rigid tubing, further rigid tubing being supported along the upper portion of said second housing portion, the opposite end of said flexible conduit means being connected with said further rigid tubing.

9. Apparatus as defined in claim 1 including a second hydraulic system substantially identical with said first hydraulic system, each of said systems being supported on said outer boom portion and being disposed substantially symmetrically on opposite sides of the longitudinal axis of the boom means.

10. Aparatus as defined in claim 9 wherein said hydraulic systems are interconnected with one another by a plurality of cross brace members extending between the hydraulic systems and being interconnected with the housing portions thereof.

References Cited

UNITED STATES PATENTS 2,984,373   5/1961   Przybylski _____ 214—141
3,178,046   4/1965   Lull _____ 214—141

HUGO O. SCHULZ, *Primary Examiner.*

U.S. Cl. X.R.

212—55